(12) United States Patent
Pope et al.

(10) Patent No.: US 10,079,919 B2
(45) Date of Patent: Sep. 18, 2018

(54) METHOD, APPARATUS AND COMPUTER PROGRAM PRODUCT FOR PROCESSING DATA

(71) Applicant: SOLARFLARE COMMUNICATIONS, INC., Irvine, CA (US)

(72) Inventors: Steve Pope, Cambridge (GB); Kieran Mansley, Cambridge (GB); Sian James, Cambridge (GB); David J. Riddoch, Cambridgeshire (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 92 days.

(21) Appl. No.: 15/167,707

(22) Filed: May 27, 2016

(65) Prior Publication Data

US 2017/0346933 A1 Nov. 30, 2017

(51) Int. Cl.
*H04L 29/08* (2006.01)
*H04L 12/931* (2013.01)
*H04L 1/00* (2006.01)

(52) U.S. Cl.
CPC .......... *H04L 69/322* (2013.01); *H04L 1/0061* (2013.01); *H04L 49/602* (2013.01); *H04L 69/32* (2013.01)

(58) Field of Classification Search
CPC .... H04L 69/322; H04L 49/602; H04L 1/0061
See application file for complete search history.

(56) References Cited

U.S. PATENT DOCUMENTS

| | | | |
|---|---|---|---|
| 5,920,703 A * | 7/1999 | Campbell | H04L 29/06 709/236 |
| 6,034,963 A | 3/2000 | Minami et al. | |
| 8,006,280 B1 | 8/2011 | Hildebrand et al. | |
| 2004/0153674 A1* | 8/2004 | Hayashi | H04L 9/0836 380/217 |
| 2006/0136570 A1 | 6/2006 | Pandya | |
| 2008/0310440 A1 | 12/2008 | Chen et al. | |
| 2010/0125477 A1 | 5/2010 | Mousseau et al. | |
| 2011/0022560 A1 | 1/2011 | Breiter et al. | |
| 2011/0202983 A1 | 8/2011 | Pope et al. | |
| 2012/0084806 A1 | 4/2012 | Fahrny et al. | |
| 2012/0246520 A1 | 9/2012 | Matsubara et al. | |
| 2012/0290702 A1 | 11/2012 | Vincent | |
| 2013/0339947 A1 | 12/2013 | Neary et al. | |

(Continued)

FOREIGN PATENT DOCUMENTS

EP  2843897 A1  3/2015

OTHER PUBLICATIONS

U.S. Appl. No. 14/660,812—Office Action dated Jul. 5, 2016, 24 pages.

(Continued)

*Primary Examiner* — Brian D Nguyen
(74) *Attorney, Agent, or Firm* — Haynes Beffel & Wolfeld LLP

(57) ABSTRACT

Data is received at a buffer used by a protocol processing stack which protocol processes the received data. The received data is made available to, for example, an application, before the protocol processing of the data is complete. If the protocol processing is successful the data made available to the application is committed.

23 Claims, 5 Drawing Sheets

(56) References Cited

U.S. PATENT DOCUMENTS

| | | |
|---|---|---|
| 2014/0053280 A1 | 2/2014 | Durazzo et al. |
| 2014/0115578 A1 | 4/2014 | Cooper et al. |
| 2015/0023373 A1* | 1/2015 | Torsner .............. H04L 1/0007 370/474 |
| 2016/0219024 A1* | 7/2016 | Verzun .............. H04L 63/102 |

OTHER PUBLICATIONS

EP 16160897.1—Extended European Search Report dated Jun. 8, 2016.
EP 17173095.5—1853—Extended European Search Report dated Oct. 13, 2017.

\* cited by examiner

METHOD, APPARATUS AND COMPUTER PROGRAM PRODUCT FOR PROCESSING DATA

FIELD

Some embodiments relate to a method, apparatus and computer program product for processing data.

BACKGROUND

Currently, when data are delivered to a data processing system via a network they typically arrive in protocol data units, also known as segments, consisting of a header of metadata combined with a block of application data payload. To process a segment of network data, the whole segment is delivered from the network so that the whole segment can be validated before passing it to the application or higher layers in a network stack. No processing will be performed by the application until the segment has been validated. As such, processing of segments is serialised in that each stage of processing is completed before the next stage can start. This can result in an unwanted delay. The last byte of a segment has to be delivered before the first byte can be processed. Network serialisation and on-the-wire speeds mean that this delay may in some scenarios be of the order of microseconds with current technology compared to normal data access speeds.

SUMMARY

According to an aspect, there is provided a method comprising: receiving data at a first buffer used by a protocol processing entity; protocol processing said received data; and causing at least part of said received data to available to a different layer function before protocol processing of said received data has been completed.

The protocol processing entity may comprise a protocol processing stack.

The different layer function comprises a higher layer function or a lower layer function or a peer layer function.

The causing at least part of said received data to be available to said different layer function, may comprise copying said data to a second buffer used by said different layer function for processing.

The different layer function may comprise one or more of an application and a hardware acceleration function.

The different layer function may comprise one or more of an encryption function, a decryption function; a compression function; a decompression function; a storage function; a video processing function; an audio processing function; a signal processing function; and a data processing function.

The method may comprise providing first information indicating that protocol processing of said data has been completed and using said first information to commit data made available to the different layer function.

The method may comprise making a call by said different layer function to determine if said protocol processing of said data has been completed.

The method may comprise writing to a queue associated with said different layer function in response to said first information indicating that protocol processing of said data has been completed.

The method may comprise making a call to discover if at least a part of said data has been delivered to said first buffer.

The method may comprise determining if a given amount of data is in said first buffer for protocol processing and causing said given amount of data to be available to said different layer function.

The method may comprise determining if data is received by determining if data has been written to said first buffer.

The method may comprise providing second information from said protocol processing entity to said different layer function.

The second information from said protocol processing entity may comprise information about the location in said first buffer of data to be processed by said different layer function.

The second information may comprise at least one of an algorithm and key information.

The information may comprise one or more of decryption information; encryption information; compression information; decompression information; video processing information; audio processing information; signal processing information; and a data processing information.

The method may comprise receiving at least part of said second information at the protocol processing entity from a higher level function.

At least part of said second information may be received in response to a determination by said higher level function that subsequent data can be processed using said second information.

The different layer function and the protocol processing entity may be configured process packet data stored in said first buffer.

According to another aspect, there is provided a computer program comprising computer executable instructions which when run is configured to cause any of the preceding methods to be performed.

According to another aspect, there is provided an apparatus comprising: a first data buffer configured to receive data; a protocol processing stack configured to protocol process said received data; and a different layer function, wherein at least part of said received data is available to the different layer function before protocol processing of said received data has been completed.

The different layer function comprises a higher layer function or a lower layer function or a peer layer function.

A second buffer may be provided, said second buffer may be configured such that said at least part of said received data to be available to said different layer function is copied to said second buffer, said second buffer being used by said different layer function for processing.

The different layer function may comprise one or more of an application and a hardware acceleration function.

The different layer function may comprise one or more of an encryption function, a decryption function; a compression function; a decompression function; a storage function; a video processing function; an audio processing function; a signal processing function; and a data processing function.

The protocol processing stack may be configured to provide to the different layer function first information indicating that protocol processing of said data has been completed and the different layer function may be configured to use said first information to commit the data made available to the different layer function.

The different layer function is configured to make a call to said protocol processing stack to determine if said protocol processing of said data has been completed.

The protocol processing stack may be configured to write to a queue associated with said different layer function in response to said first information indicating that protocol processing of said data has been completed.

The different layer function or an interface may be configured to make a call to discover if at least a part of said data has been delivered to said first buffer.

The different layer function or an interface may be configured to wait until a given amount of data is in said first buffer for protocol processing.

The protocol stack may be configured to provide second information to said different layer function.

The second information from said protocol stack may comprise information about the location in said first buffer of data to be processed by said different layer function.

The second information may comprise at least one of an algorithm and key information.

The information may comprise one or more of decryption information; encryption information; compression information; decompression information; video processing information; audio processing information; signal processing information; and a data processing information.

The protocol stack may be configured to receive at least part of said second information from a higher level function. That may be an application.

At least part of said second information may be received in response to a determination by said higher level function that subsequent data can be processed using said second information.

The different layer function and the protocol stack may be configured process packet data stored in said first buffer.

According to another aspect, there is provided a computer program product, the computer program product being embodied on a non-transient computer-readable medium and configured so as when executed on at least one processor to cause: receiving of data at a first buffer used by a protocol processing entity; protocol processing of said received data; and causing at least part of said received data to available to a different layer function before protocol processing of said received data has been completed.

According to some aspects, there is provided a program product comprising a computer-readable storage device including a computer-readable program, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

DESCRIPTION OF THE DRAWINGS

Some embodiments will now be described by way of example only with reference to the accompanying drawings, in which.

DETAILED DESCRIPTION OF EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
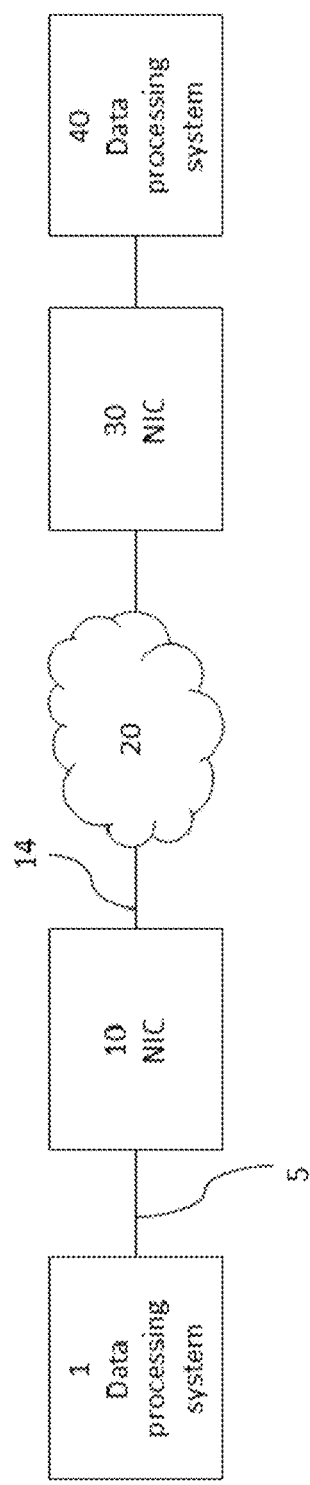
FIG. 1 is a schematic diagram of a network.

FIG. 1 is a schematic diagram showing a network interface device such as a network interface card (NIC) and the general architecture of the system in which it may be used. The network interface device 10 is connected via a data link 5 to a processing device such as computer 1, and via a data link 14 to a data network 20. Further network interface devices 30 are also connected to the network, providing interfaces between the network and further processing devices such as processing device 40.

The data processing device 1 and/or 40 and may, for example, be a personal computer, a server or a dedicated processing device such as a data logger or controller.

Figure 4:
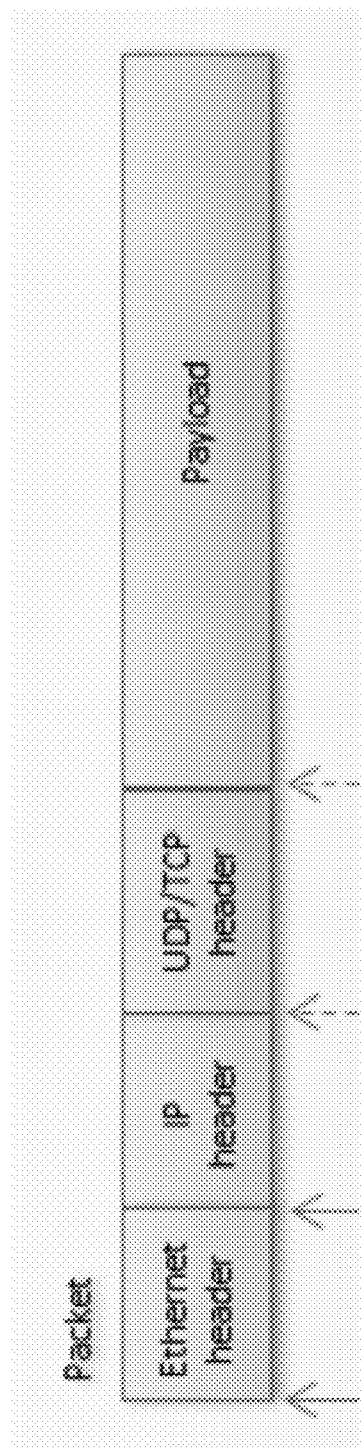
FIG. 4 is a schematic view of a packet.

Reference is made to FIG. 4 which schematically shows a data structure which may be used in some embodiments using TCP/IP. The data structure has a payload part with application data with a TCP header (segment). An IP layer header is also provided. The segment is thus encapsulated into an IP datagram. An Ethernet header is provided to thus provide a frame.

It should be appreciated that this is by way of example and in other embodiments, the data structure may comply with any other suitable protocols. For example, instead of TCP, UDP may be used. More or less than these three headers may be provided. Other examples: application/presentation headers such as http/XML, data with some components encrypted or compressed or the like.

It should be appreciated that different examples of the particular layer header may be used in some embodiments.

Figure 2:
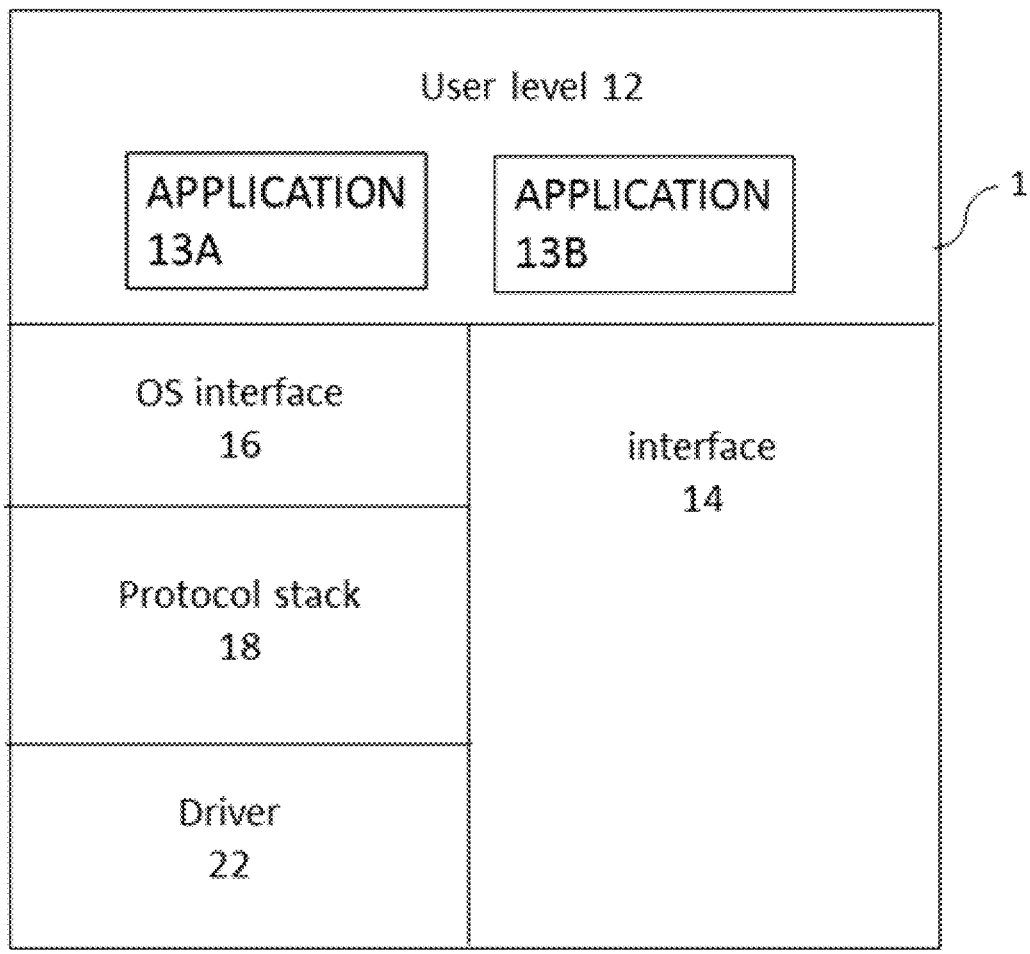
FIG. 2 is schematic view of a processing device of FIG. 1.

Reference is made to FIG. 2 which schematically shows an example of a data processing system. The data processing system has an operating system supporting applications 13A and 13B at a user-level 12. Protocol processing may be carried out at the user level as will be discussed later or may be performed by a protocol stack 18 in the operating system. Where the protocol processing is performed at the user level, an interface 14 to the network interface device may be provided between the user level and the network interface device. Where the protocol processing is performed by the protocol stack 18, a driver 22 for and/or interface to the network interface device may be provided. An OS interface 16 may be provided between the user level 12 and the protocol stack 18.

Figure 3:
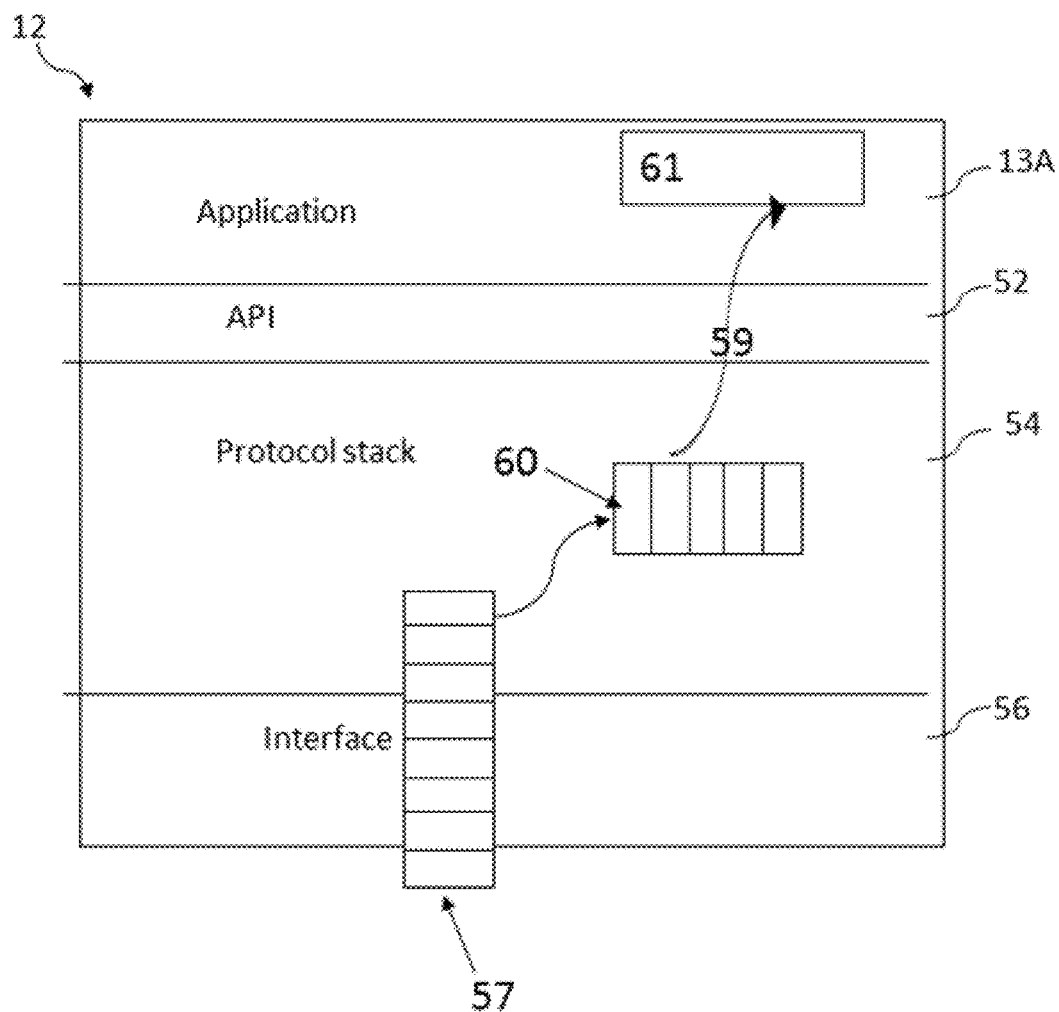
FIG. 3 is a schematic view of the user level of FIG. 2.

Reference is made to FIG. 3 which schematically shows part of the user space 12 associated with one of the application 13A. A protocol processing stack 54 is provided at the user level. This protocol processing stack may be implemented by software running on at least one processor. An API 52 is provided between the protocol processing stack 54 and the application 13A. An interface 56 to the operating system and/or network interface device 56 is provided.

In some embodiments, the protocol processing stack and API are configured to allow early portions of a network segment that have been already been delivered to be revealed to the application or higher layers in the network stack before the whole network segment has been delivered. Thus the application can start processing the received parts of the network segment before the protocol processing stack has, for example, confirmed the segment to be valid. As more of the network segment is delivered, more portions of the network segment can be revealed. Finally, once the whole network segment has been delivered, the whole network segment can be validated by the protocol processing stack. If the validation is successful, the delivered portions of the network segment can be committed to the higher layers of the protocol processing stack or the application. If the validation is unsuccessful, the delivered portions of the segment can be rescinded. This allows higher layer processing of the segment by for example the application to start as soon as relevant bytes are available rather than having to wait for the whole segment to be delivered and processed.

If the application does not receive an indication that the segment is valid, the parts of the segment which have been processed by the application are discarded or are not committed. If the application does receive an indication that the segment is valid, the processed segment data is committed. This contrasts with known arrangements where the segment is only delivered to the application from the protocol stack when the segment has been validated by the network protocol processing stack. This may reduce the delay in providing data to an application.

The segments may consist of two or more layers of network and application headers each encapsulated within the next. Network headers may be the first part of the segment on the wire (i.e. the first data of the segment to be transmitted), with the payload following. By allowing each layer to indicate the size and location of its headers relative to others within a network, the network stack can determine how much of the segment should be received before the segment data can be revealed to the next layer. It should be appreciated, that alternatively or additionally to network headers, a layer or application may be interested in a certain block of payload within a segment to allow it to start early processing.

In some embodiments, the communication of an application of a device over a network may be facilitated through the use of sockets. A socket may form an end-point for a communication over a network. The management of the sockets, for example determining whether a socket is ready to be processed by an application, may be carried out by the application making system calls. System calls to determine whether one or more sockets are ready for processing may return an indication of the sockets that can be processed.

One example of processing that could begin early is the copying of the payload data to its final location in memory. The API 52 may be a BSD Sockets API. Segments 57 are initially delivered by the network interface device to an intermediate buffer 60. The intermediate buffer may be in the OS memory space, application memory space or shared memory space. The buffer 60 will be provided in memory which can be accessed by the protocol stack 54 in the user level and by the network interface device.

The protocol processing stack 54 processes the segment in this buffer 60.

In some embodiments, the processed segments are written to a further working buffer for example the POSIX socket recv( ) API call specifies an application buffer 61 to which data should be copied. In some embodiments, the segment may be processed by the application within the intermediate buffer, so an application or working buffer is not required. Where a working buffer is provided, the working buffer may be in the OS memory space, application memory space or shared memory space although usually it is in the application memory space. The working buffer 61 will be provided in memory which can be accessed by the protocol stack 54 in the user level. The intermediate buffer and the working buffer may be in the same memory space, at different locations or in different memory space.

The application will indicate the working buffer 60 for the payload to be delivered to, and so the payload bytes must be copied there (represented by arrow 59) from the intermediate buffer before indicating to the application that the data delivery is complete.

Normally this copying will not start until the whole payload has been received and validated by the network stack. However, in some embodiments, the BSD sockets layer of the network stack is provided with early access to the initial bytes of payload, so that the BSD sockets layer is able to start copying those to the final location as indicated by the application. As more of the payload is received from the network, more can be delivered to the final location until the whole segment is received.

Validation may comprise performing one or more of:

ensuring all data bytes are present according to the transport layer semantics; and ensuring all data validity checks are correct. Example hardware has completed TCP/IP checksum validation and software has received an indication from hardware (e.g. by an event that these checks have passed)

If the segment validation succeeds the application can then be notified that the data delivery is complete. If the segment validation fails, the application will not be notified, and the bad bytes of data will be overwritten by a subsequent (valid) segment. In alternative embodiments, the application will be notified if segment validation fails.

This approach allows the copying to the application's buffer to proceed in parallel with the delivery of bytes from the network, rather than serialising those two processes. In this way the application can be notified sooner. This may reduce network latency.

In some embodiments the network stack is used without the BSD sockets layer. In this case the application may similarly be provided with early access to the intermediate buffer and may start to process the data before all the whole segment has been received and validation performed. In this case there is no requirement for a working buffer.

In operation, an application wishing to receive network packets over the network may create a port to which network packets may be addressed. Packets addressed to the port number of the port and IP address of the host will be processed by the protocol stack after being received at the NIC. The port may be bound to a socket which acts as a communication end-point.

When a packet arrives at the NIC, the NIC copies the packet to the intermediate buffer. The protocol stack may protocol process the packet to provide a data segment of the packet. In some example, the data segment may correspond to the payload data of the packet, however in some examples, (such as a 'raw' Ethernet socket) the entire data segment will comprise the network packet after protocol processing.

The application may make a discover call to discover if the values in the buffer are changing, indicating that a data is being received. If the values in the buffer are changing, the data is copied to or revealed to the application. A response to a discover call may be made if x amount of bytes in the buffer have been delivered to the buffer. In other word x amount of bytes of data have been written to the buffer.

After protocol processing the protocol stack may optionally enqueue the data segment of the packet on a socket queue of a socket associated with the address of the packet. An indication may be placed on a data-structure associated with that socket when protocol processing has been completed. The corresponding indication may be for example a notification that data has been queued for the socket or that the protocol processing has been completed.

When an application would like to know if an event of interest has occurred on one or more sockets, the application may make call an event monitor such as the epoll_create, epoll_ctl, epoll_wait interface. The event monitor may determine the status of the sockets and return this information to the application. The status may be for example that a number of bytes have been validated and are available to read on a socket. The application may then use this information to commit the data which has already been copied.

The protocol processing of a packet in the buffer may be triggered by an API call including a library call or a system call made by an application and/or on the occurance of a timeout.

One example of the implementation of the API will now be described. The API may be implemented by a computer program which comprises executable instructions which are run on one or more processors.

In this embodiment, the API is configured to use polling of higher protocol layers. Other embodiments may use one or more of instructions which cause pushing of data blocks by lower layers, call backs and non-blocking calls.

In some embodiments, the API may provide one or more of the following operations.

1. Discovery of a new segment that is currently being delivered. The application will call this discovery function in the API and the discovery function will block until the layer below the application is aware of a segment of data that being delivered by the network into the intermediate buffer. The information structure associated with the discovery function will be completed by the layer with details of the segment being received such as its location in memory (intermediate buffer) and how many bytes are currently available, and allow tracking of this segment between API calls. The status of the call (success, or error) is set in the return value.
discover(struct_info*info)
2. Indicating a number of bytes of the segment that is required, and waiting for those to be available. The caller (application) will use this to ensure there is enough data available to it to begin or continue its processing. The call will block until the requested number of bytes are available. The status of the call (success, or error) is set in the return value.
wait(struct_info*info, bytes_required)
3. Waiting for the whole segment to be delivered, and discovering its validity. The caller (application) will use this once it has finished its own processing to wait for a packet to be fully received and validated so that it can notify higher layers or the application in the normal way. The status of the call (success, or error) is set in the return value.
complete(struct_info*info)

The division of functionality between these operations may be modified without affecting the overall functionality.

It should be appreciated that this is one example of how embodiments may be used. There are many other examples of how this API could be used, it is not restricted to the copying data example.

The above example has a TCP segment processing lower layer and an application higher level. It should be appreciated that this is by way of example only and in other embodiments, any other lower layer/higher layer/peer layer combination may be used.

Another aspect of the API concerns mixed hardware and software processing and optimisation of cases where partial processing of the frame may take place in parallel or overlapped at different protocol layers in a stack.

In the accepted OSI 7 layer model of protocol stacks, each layer sequentially performs some aspect of processing, generally aimed at gradually increasing the abstraction between the network and the application layer.

The model assumes that an entire application or processing operation can be entirely expressed at any given layer of the protocol stack without regard to other (usually upper) layers. For example an IP layer 3 routing function is able to entirely make interface forwarding decisions based on the IP protocol headers without considering (or processing) any upper layer (e.g. TCP or application payload data) which may have been contained in the frame.

During the evolution of protocol stack design, the processing, including the de-multiplexing of each layer in turn was seen to be inefficient. For example the application level framing principle ALF proposes dividing a packet into several parts and processing each part containing header fields after processing the data part. Data manipulation functions may be separated from transfer control functions. However, ADU (Application data units) are deeply embedded (using ASN.1 syntax) and known at every level in the protocol. The ADU are provided in the payload.

ALF did not gain traction, although a layering methodology is used in modern day protocol design and implementation. For example, layering of application protocols either over the byte stream abstraction presented by TCP or the UDP unreliable datagram are popular and ubiquitous. Attempts to add further structure (SCTP) for example have largely failed to gain significant traction.

There are some aspects of this approach which may be problematic in some situations. The first is that as data centre networking latency has reduced, the overhead of even minimal protocol processing may be a factor in the time of flight latency. For example this may be equal to ⅓ of the hardware latency in some situations.

Some embodiments allow the protocol stack at every layer to interact with the layer below and both influence processing based on knowledge at the higher level of abstraction or to perform processing in parallel or overlapping that which is happening at the lower level of abstraction.

One embodiment which has previously been described allows the copying of data to be parallelised or overlap with the segment delivery and validation of the segment. This delivery may be from the network interface device.

Another example where lower layer processing may be influenced is the inclusion of a set of operation calls in the API. For example a splice may be used to indicate that a portion of the segment being processed at a lower level be identified and processing be paused until higher level processing of another portion of the segment has been completed. This processing may enable the lower level to perform a more efficient operation. This may be for example to discard the identified portion or to deliver the identified portion elsewhere, For example where the lower protocol level may optionally be offloaded to a hardware device—one hardware device could (for example a network interface) be instructed by the higher level protocol to deliver an identified portion of the frame directly to another hardware device (for example a decompression or decryption device), removing the requirement for frame data to be delivered in software through higher protocol layers before being passed down through lower protocol layers for the offload operation.

splice can indicate actions to be taken in the future based on current protocol state—even before a segment has arrived. In one example, a protocol layer could know that the next segment to arrive should contain a particular header structure and that some of these headers and the remaining segment should be delivered by direct hardware transfer from the network to the storage controller. The splice call can indicate that the same action be repeated for all subsequent segments or just the next segment.

The API detail provided shows
wait (struct info*info, int bytes_required)
A more general interpretation of the API would have for example:
wait (struct info*info, void*data)
to provide for any arbitrary data representation and could be used for example to indicate that the lower layer should wait for the next message headers required where these headers are of variable length, but may be described using an abstract syntax.

A more general implementation of the API would have
operation (struct info*info, void*data, void*bytecode)
which also provides for an arbitrary bytecode operation. This is an instruction set which can be interpreted by the lower layer.

Examples of operations which could be encoded would be:

Using a bytecode similar to BPF (BSD packet filter) or a microcode would allow flexible filtering, discard, rate limiting, or splicing to be specified.

Using a bytecode similar to or as expressive as the programming language LUA would enable encryption/decryption operations to be specified.

The execution of the bytecode could be optimised by the lower layer, for example by using pre-compilation or just in time or on the fly compilation techniques.

One benefit of chaining such protocol layer interactions is that the abstraction provided by each layer of protocol is largely preserved and that in many cases the API may provide for an optional optimisation should it be deemed possible by the lower level. In many cases this reduces the complexity which would otherwise have been caused by layer integration. For example, it may be possible for a lower level to offload decryption of a block to hardware, provided that it is given a key which is known only to the higher-level. Integrating the processing layers would cause a single protocol layer to be required to deal with many and varied hardware decryption engines and deal with access to these as well as key management. Instead both functions are cleanly separable and may be optimised.

There are cryptographic protocols which are amenable to fast hardware implementations, for example AES (Advanced Encryption Standard). The benefits of hardware acceleration for encryption operations are known however it may be challenging to integrate hardware accelerators into general software stacks.

For example if an AES decryption operation is implemented within a NIC, it is possible for the NIC data path to deliver fully decrypted frames to the host.

One example of a hardware offload system would be able to take as input a cypher-block of data which has been extracted by the NIC from the network frame, together with a key and decrypt at line-rate, passing back the decrypted block to the data-path which would replace the original encrypted portion with the decrypted output. If the operations proceed on the fly, then the host would receive fully decrypted network frames and would not incur any penalty in decryption.

The requirements of buffering, key management and protocol processing for hardware offloading may depend on the network protocols being employed.

For example, protocols where encryption is employed at the OSI network layer (for example IPsec) may require a relatively small number of keys to be stored and managed. Using IPsec, typically large numbers of flows (for example, all flows for a given IP subnet) may be managed in aggregate and using the same keys. IPsec is commonly used where an IP network spans physical networks which are outside of the physical security domain of an organisation (e.g. between data centers where traffic is carried on leased connections or the public Internet). The encrypted payload is carried entirely within an IP segment and so may be easily identified (parsed) by network hardware and usually entirely contained within a single layer 2 (e.g. Ethernet) frame. Where it is not, IP de-segmentation would be carried out). IPsec offload may be provided within a NIC interface.

In contrast, protocols where encryption is employed at the ISO application layer (such as SSL) require the management of very large numbers of flows, involving challenging key management, buffering and protocol processing operations. To identify an SSL block for decryption, the NIC may perform TCP processing. This may be the entire protocol or at least TCP reassembly which takes into account missing and out of order data. The correct key for the particular flow is determined before decrypting. There may be typically hundreds of IPSec keys in use on a server but tens of or even hundreds of thousands of SSL sessions active at a server. The interleaving of SSL flows means that significant buffering may be required to perform reassembly (even where there is no significant loss). Application layers sessions are often short lived meaning that the hardware would be required to handle very large numbers of keys and a high rate of updates.

For these reasons network level operations such as IPSec offload as described above may be implemented in an in-line manner in a NIC, but application level operations such as SSL offload typically are not.

It is more common to employ logically distinct accelerator hardware functions which are engaged after protocol stack processing has taken place up to the application layer.

For example there exist hardware engines which are sent a block of data by the application layer of the stack (e.g. SSL) together with the key for decryption. These hardware engines may be connected to the IO bus and so their use requires an additional data transfer from host memory (after transport processing has taken place) back over the IO bus to the hardware engine, then back again to host memory after the decryption operation. More recently these engines are becoming integrated within general purpose CPUs. Since these engines generally operate on data blocks which are in cache (and are aware of the CPU's cache coherence mechanisms) there may be no requirement for significant data movement. However the actual operation of such hardware engines differs significantly and so their operation is generally integrated within a distinct protocol stack. Even with the existence of such integrated engines, the cost of fully traversing distinct (peer) protocol stacks may be significant.

Similar issues are associated with data compression.

For example, at any given level of the protocol stack, peer protocol stacks may be provided logically side-by-side and abstracted away by the given (for example, SSL) level.

In this case, SSL is aware of both an underlying crypto-assist stack and an underlying networking stack. Each underlying stack carries out its own operations and generally are not linked. Equally the higher level (SSL) is unaware of the detail and complexity of each of the peer underlying stacks.

For example SSL has the operation of the actual hardware abstracted away.

Equivalent peering of stacks exist also between storage and networking and more generally the cross-product of inter-related functions means that it is good practice to maintain this separation between stacks.

SSL and many application stacks are typically implemented as libraries and execute at user-mode (for example OpenSSL)

Underlying stacks typically are implemented within the operating system (although specialised user-mode stacks such as OpenOnload provided by the applicant exist). Therefore commonly the API between the application level and transport level typically involves a system call and context switch to kernel mode. Typical APIs require a copy of data between the network and transport level.

Figure 5:
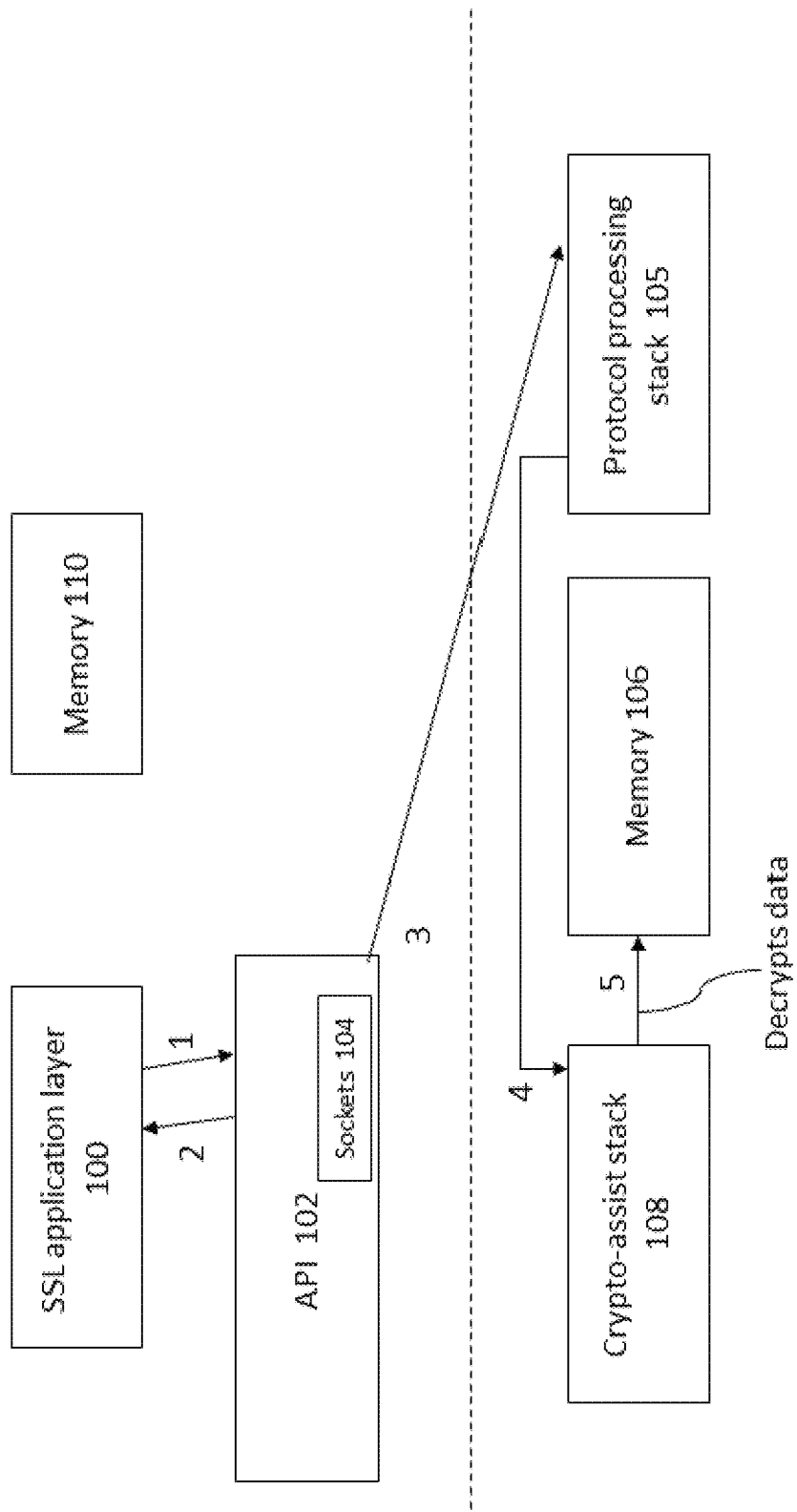
FIG. 5 shows a schematic view of a decryption arrangement

The SSL stack may benefit from the ability to specify data movement operations between the network stack and crypto (or other offload stack) based on its partial processing. Having a more flexible API such as provided by embodiments may allow such operations to be described. Reference is made to FIG. 5 which shows such an example.

A SSL application layer 100 is provided. This is in the user space. An API 102 is provided with sockets 104. A queue of data may be associated with a respective socket along with a queue of events. The API provided an interface to the operating system. Memory 110 accessible to the application is provided. This may be in the user space or elsewhere. The dotted line in FIG. 5 shows the user space above the dotted line and the operating system below the dotted line. In the operating system, a protocol processing stack 105 is provided in parallel with a crypto assist stack 108. Memory 106 is provided to store the received packets. This memory is accessible by the protocol stack 105 and the crypto-assist stack 108. This memory maybe in the OS space.

It should be appreciated that in other embodiments, the crypto-assist stack and the protocol processing stack may be in user space. The associated memory may also be in user space.

The SSL receives an indication that data is available on a given network socket by means of an epoll( ) call (referenced 1 in FIG. 5) made by the SSL application to the API and the associated response (referenced 2 in Figure). Based on the socket indicated, the SSL layer may have available the decryption key and algorithm for the next data on the socket. The decryption key and algorithm may be stored in the memory 110.

Instead of calling a recv( ) call as is usual, the SSL library (API) may request that the underlying network stack 105 either (a) deliver decrypted data if the amount of data is less than a threshold or (b) deliver up to N bytes of decrypted data which has been processed by the crypto-stack 108 using a particular key and algorithm, which is stored in the memory 110. The algorithm may be an AES256 or similar algorithm and the key may be a session key. In some embodiments, this may be advantageously used with the software decryption of small blocks of data.

This request, which is referenced 3 in FIG. 5, may be encoded as a bytecode or other abstract representation of the algorithm which may be provided as argument to a splice( ) call.

The protocol processing stack 105 executing within the operating system (or in a user space library) will by virtue of transport layer (TCP processing) be able to determine how many bytes of data are available for reading on the socket. The network stack will not understand AES or session keys, but as it is aware of the existence of a peer crypto assist stack even if only by name, it then can pass the data together with the opaque AES and session keys which will indicate how to process the data to the peer crypto assist stack. This is referenced 4. The network stack can provide information which will identify the location of the data in question in the memory 106.

If the peer crypto assist stack is aware of the algorithm specified then it will proceed to decrypt the data (referenced 5 in FIG. 5) and may make use of any hardware accelerators available to it. If this is performed in the same address space as the network stack, i.e. in memory 106 then these operations can take place without any unnecessary data movement.

In some embodiments, the data can be written from the NIC to the memory 106.

In the case of embodiments used to optimise the copy of data, then a lower layer could be dealing with segments arriving from the network in many different manners for example, a Layer2/Ethernet frame at a time which could be split into many memory regions through the gather-list operations of a DMA controller, or numbers of coalesced frames into a single large or multiple memory regions, or as a number of small chunks representing portions of a network frame. Some embodiments may provide for the possibility of a lower layer dealing with any of these delivery mechanisms.

It should be appreciated that embodiments may have a wide application. There data may be made available to a higher layer function, a lower layer function or a peer layer function, as compared to the protocol processing function. The layer function may be one or more of an application and a hardware acceleration function. For example the hardware function may be one or more of an encryption function, a decryption function; a compression function; a decompression function; a storage function; a video processing function; an audio processing function; a signal processing function; and a data processing function.

Some embodiments, have been concerned with processing in the server, for example. However, it should be appreciated that some embodiments may be used where there is a protocol processing function and an application/hardware acceleration function on a network interface device or where the protocol processing function and the application/hardware acceleration function are on different devices. One device could be a network interface device and the other device may be a data processing device.

Embodiments may be implemented using computer software comprising computer executable instructions. The computer executable instructions may be provided on a non-transitory computer medium. The computer executable instructions may when run, allow embodiments of the invention to be implemented. The computer executable instructions may be run one or more processors. The instructions maybe stored in memory. The instructions may be provided in a library and may be used to control the behaviour of an interface between two layers. The instructions may be used to control the behaviour of one or both of the two layers.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
   receiving transport layer segments of data at a first buffer used by a protocol processing entity;
   transport layer protocol processing segments of said received data; and
   causing at least part of said segments to be available to a different protocol layer function before delivery to the first buffer of a whole of a respective segment has been completed.

2. A method as claimed in claim 1, wherein said protocol processing entity comprises a protocol processing stack.

3. A method as claimed in claim 1, wherein said different protocol layer function comprises one of a higher protocol layer function, a lower protocol layer function and a peer protocol layer function.

4. A method as claimed in claim 1, wherein said causing at least part of said segments to be available to said different protocol layer function, comprises copying data of said at least a part of said segments to a second buffer used by said different protocol layer function for processing.

5. A method as claimed in claim 1, wherein said different protocol layer function comprises one or more of an application and a hardware acceleration function.

6. A method as claimed in claim 1 wherein said different protocol layer function comprises one or more of an encryption function, a decryption function; a compression function; a decompression function; a storage function; a video processing function; an audio processing function; a signal processing function; and a data processing function.

7. A method as claimed in claim 1, comprising providing first information indicating that transport layer protocol processing of a respective segment has been completed and using said first information to commit data associated with said respective segment made available to the different layer function.

8. A method as claimed in claim 7, comprising making a call by said different protocol layer function to determine if said transport layer protocol processing of said respective segment has been completed.

9. A method as claimed in claim 8, comprising writing to a queue associated with said different protocol layer function in response to said first information indicating that transport layer protocol processing of said respective segment has been completed.

10. A method as claimed in claim 1, comprising making a call to discover if at least a part of a respective segment has been delivered to said first buffer.

11. A method as claimed in claim 1, comprising determining if a given amount of data of a respective segment is in said first buffer for protocol processing and causing said given amount of data to be available to said different protocol layer function.

12. A method as claimed in claim 11, comprising determining if the data is received by determining if data of at least one segment has been written to said first buffer.

13. A method as claimed in claim 1, comprising providing second information from said protocol processing entity to said different protocol layer function.

14. A method as claimed in claim 13, wherein said second information from said protocol processing entity comprises information about the location in said first buffer of data of at least a part of a segment to be processed by said different protocol layer function.

15. A method as claimed in claim 13, wherein said second information comprises at least one of an algorithm and key information.

16. A method as claimed in claim 13, wherein said second information comprises one or more of decryption information; encryption information; compression information; decompression information; video processing information; audio processing information; signal processing information; and a data processing information.

17. A method as claimed in claim 13, comprising receiving at least part of said second information at the protocol processing entity from a higher level function.

18. A method as claimed in claim 17, wherein said at least part of said second information is received in response to a determination by said higher protocol level function that subsequent data of one or more segments can be processed using said second information.

19. A method as claimed in claim 1, wherein said different protocol layer function and said protocol processing entity are configured process packet data stored in said first buffer, said packet data being provided by said segments.

20. An apparatus comprising:
    a first data buffer configured to receive transport layer segments of data;
    a protocol processing stack configured to transport layer protocol process segments of said received data; and
    a different protocol layer function, wherein at least part of said segments is available to the different protocol layer function before delivery to the first buffer of a whole of a respective segment has been completed.

21. A computer program product, the computer program product being embodied on a non-transient computer-readable medium and configured so as when executed on at least one processor to cause:
    receiving transport layer segments of data at a first buffer used by a protocol processing entity;
    transport layer protocol processing segments of said received data; and
    causing at least part of said segments to be available to a different protocol layer function before delivery to the first buffer of a whole of a respective segment has been completed.

22. A method comprising:
    receiving data at a first buffer used by a protocol processing entity;
    protocol processing said received data;
    causing at least part of said received data to be available to a different layer function before protocol processing of said received data has been completed; and providing first information indicating that protocol processing of said data has been completed and using said first information to commit data made available to the different layer function.

23. An apparatus comprising:
a first data buffer configured to receive data;
a protocol processing stack configured to protocol process said received data; and
a different layer function, wherein at least part of said received data is available to the different layer function before protocol processing of said received data has been completed, and wherein first information is provided indicating that protocol processing of said received data has been completed such that the first information is used to commit data made available to the different layer function.

* * * * *